(12) United States Patent
Balasubramanian et al.

(10) Patent No.: US 12,117,303 B2
(45) Date of Patent: Oct. 15, 2024

(54) ROUTE PLANNING BASED ON BATTERY STATE OF HEALTH

(71) Applicant: Rivian IP Holdings, LLC, Plymouth, MI (US)

(72) Inventors: Sundaresan Balasubramanian, Tustin, CA (US); Paul McLachlan, San Francisco, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 161 days.

(21) Appl. No.: 17/903,234

(22) Filed: Sep. 6, 2022

(65) Prior Publication Data

US 2024/0077322 A1 Mar. 7, 2024

(51) Int. Cl.
*G01C 21/34* (2006.01)
*B60L 58/13* (2019.01)
*B60L 58/16* (2019.01)
*G01C 21/36* (2006.01)

(52) U.S. Cl.
CPC .......... *G01C 21/3469* (2013.01); *B60L 58/13* (2019.02); *B60L 58/16* (2019.02); *G01C 21/3617* (2013.01); *B60L 2240/60* (2013.01); *B60L 2240/70* (2013.01); *B60L 2260/52* (2013.01)

(58) Field of Classification Search
CPC .. B60L 2240/70; B60L 2240/60; B60L 58/16; B60L 58/13; B60L 2260/52; G01C 21/3469; G01C 21/3617
See application file for complete search history.

(56) References Cited

U.S. PATENT DOCUMENTS

| | | | |
|---|---|---|---|
| 10,809,733 B2 * | 10/2020 | Lindemann | B60L 53/63 |
| 10,852,737 B2 * | 12/2020 | Szubbocsev | B60L 58/16 |
| 11,391,597 B2 * | 7/2022 | Teske | G01C 21/3697 |
| 2023/0010974 A1 * | 1/2023 | Cho | G05D 1/0295 |

\* cited by examiner

*Primary Examiner* — Gonzalo Laguarda
(74) *Attorney, Agent, or Firm* — Foley & Lardner LLP

(57) ABSTRACT

Systems and methods for providing instructions associated with directions to a destination are disclosed. In some embodiments, an electric vehicle transmits a request for directions to a destination. The electric vehicle receives instructions, which are determined based on battery state-of-health of the electric vehicle, associated with the directions to the destination. The directions comprise an itinerary determined in accordance with the battery state-of-health.

18 Claims, 6 Drawing Sheets

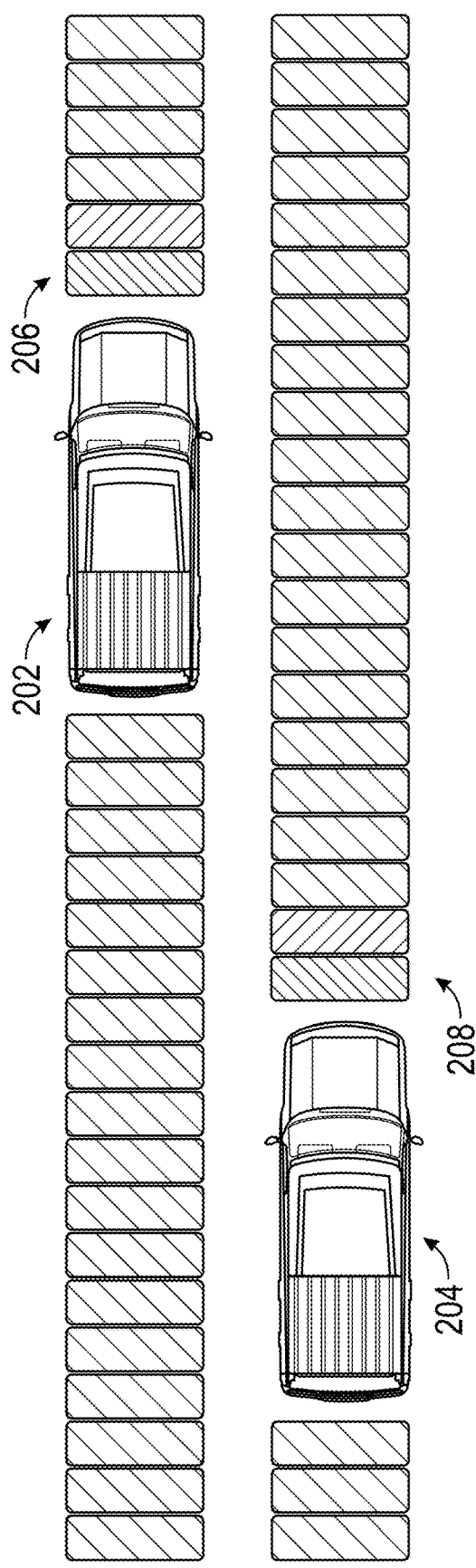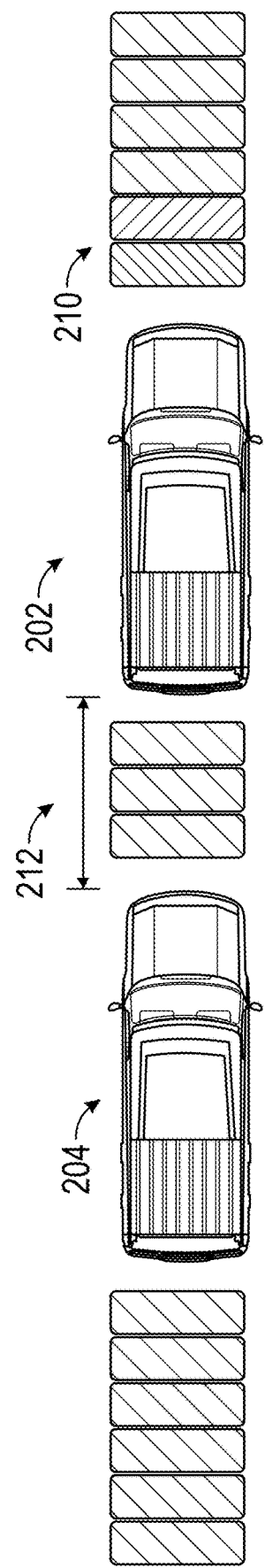
FIG. 2A
FIG. 2B

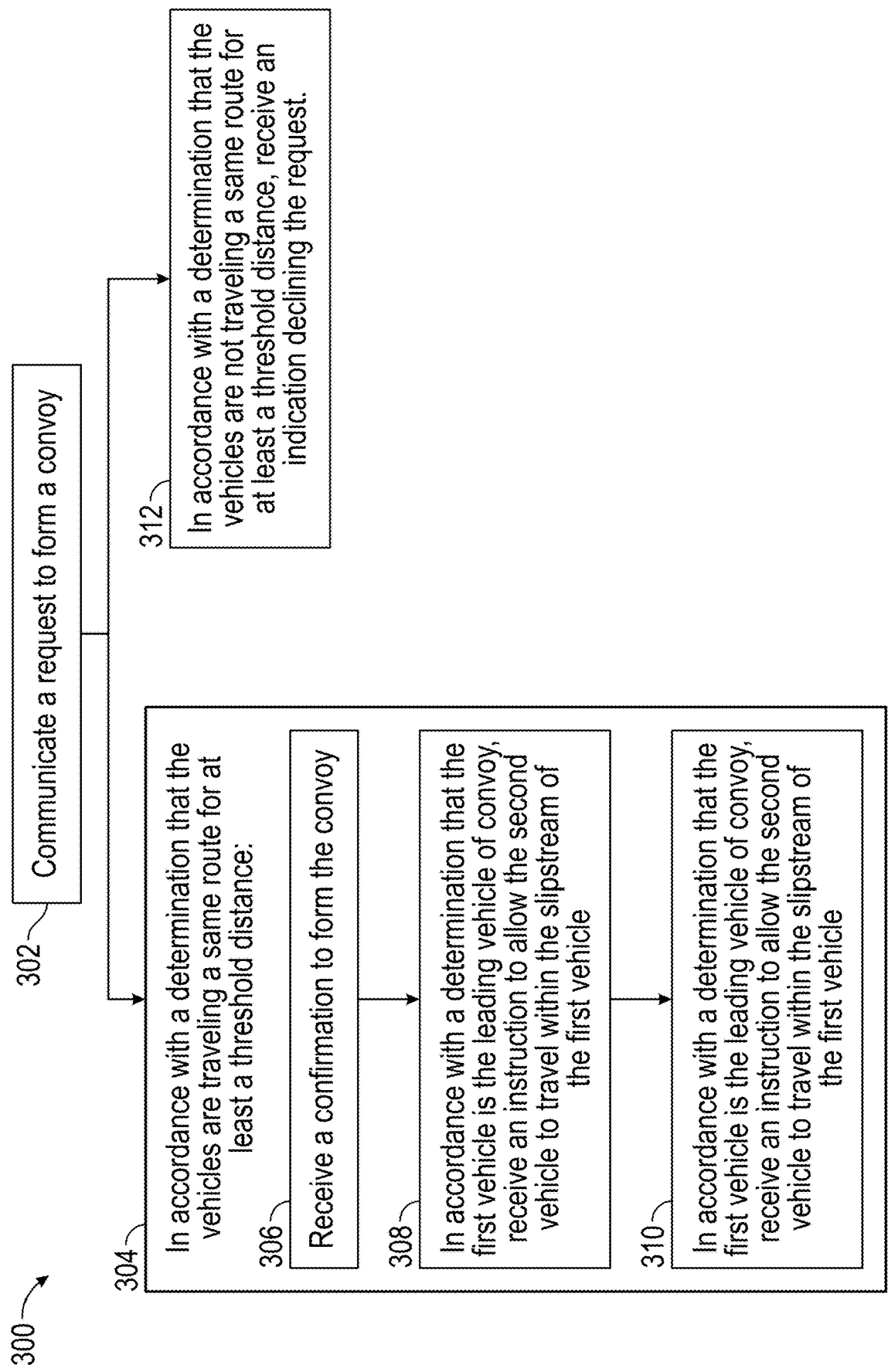

ROUTE PLANNING BASED ON BATTERY STATE OF HEALTH

A condition of an electric vehicle battery may affect accuracy of route planning for the electric vehicle. For example, a battery condition, such as the battery's state-of-health, may affect charge consumption behavior or the battery's maximum state-of-charge, and an electric vehicle's battery condition may not allow the vehicle to travel the route as planned (e.g., the vehicle's range is over-estimated). However, routing guidance is agnostic to battery conditions. For example, the battery state-of-health is not conveyed for route planning.

BRIEF SUMMARY

Systems and methods for providing instructions associated with directions to a destination are disclosed. In some embodiments, an electric vehicle transmits a request for directions to a destination. The electric vehicle receives instructions, which are determined based on battery state-of-health of the electric vehicle, associated with the directions to the destination. The directions comprise an itinerary determined in accordance with the battery state-of-health.

The embodiments disclosed above are examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 2A and 2B illustrate exemplary diagrams of a convoy formation.

FIG. 3 is a flowchart illustrating steps of a method for forming a convoy.

DETAILED DESCRIPTION

Figure 1:
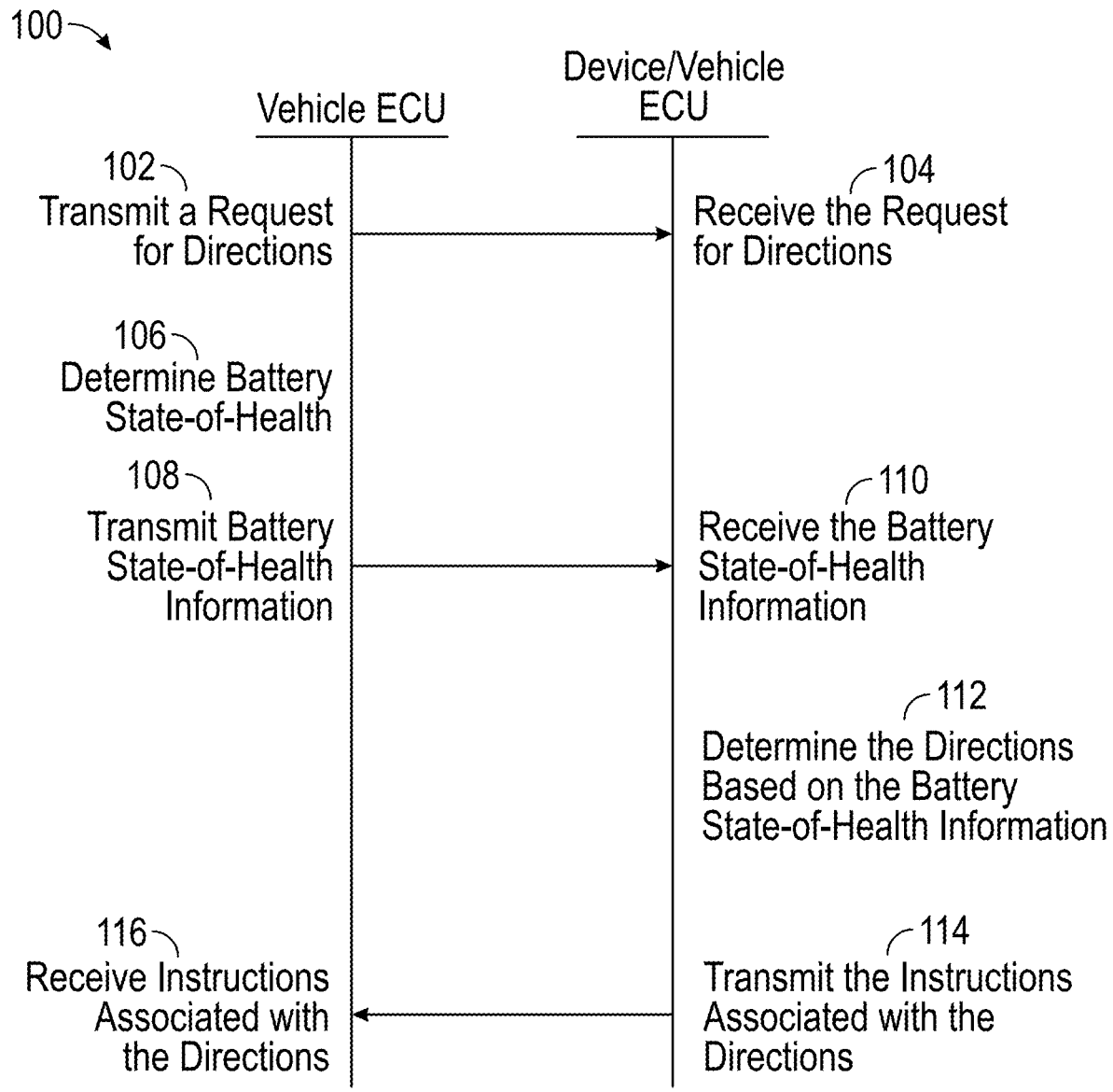
FIG. 1 is a diagram illustrating providing of instructions associated with directions to a destination.

FIG. 1 is a diagram 100 illustrating providing of instructions associated with directions to a destination. In some embodiments, the steps of diagram 100 involve interactions between a vehicle ECU (e.g., one or more ECU of vehicle 400) and a second device (e.g., server 520, server 530, landscape feature 540, computing device 550), another portion of the vehicle ECU, or another vehicle ECU (e.g., another one or more ECU of vehicle 400). The steps of diagram 100 may be performed with the systems described with respect to FIGS. 4-6B. It is appreciated that the steps of diagram 100 leverage the features and advantages described with respect to FIGS. 4-6B.

In some embodiments, a request for directions is transmitted (step 102). For example, a request for directions is transmitted by vehicle 400. The request for directions may be initiated by a user of the vehicle 400. For example, the user would like navigation guidance to the destination, and provides an input to an ECU of the vehicle 400 for requesting the directions to the destination. The request for directions may also be initiated by the vehicle 400 and/or a remote user (e.g., an operator of a fleet of vehicles, a user of the vehicle 400 requesting directions via a mobile device). In some embodiments, the request for directions may be transmitted up to 7-30 days before the associated trip. In some embodiments, the request for directions is received (step 104). For example, another portion of the vehicle ECU, a second device, or another ECU of the vehicle receives the request for directions.

In some embodiments, the battery SoH is determined (step 106). For example, the vehicle ECU determines the battery SoH. In some embodiments, the battery SoH is associated with a storage capacity of one or more batteries of the vehicle. The battery SoH may be determined by the BMS ECU, as described above. A lower battery SoH indicates that the storage capacity of the one or more batteries is lower than one or more batteries having a higher battery SoH. The battery SoH may be a function of vehicle usage behaviors, such as rate of battery consumption (e.g., rapid discharges such as hard accelerations), temperature, and charging cycles. In some embodiments, the battery SoH is determined by a second device based on data associated with the battery.

In some embodiments, the battery SoH information is transmitted (step 108). For example, information associated with the battery SoH determined from step 106 is transmitted to another portion of the vehicle ECU, another vehicle ECU, or a second device. In some embodiments, the battery SoH information is part of a packet. In addition to battery SoH information, the packet may include other battery-related information, such as battery SoC, unique identifiers associated with the battery, time stamps, and personally identifiable information. In some embodiments, the packet comprises the request for direction, and the request for direction and battery SoH information are transmitted together in this packet. In some embodiments, the packet comprises user preferences (as described in more detail below). In some embodiments, the packet comprises a distance, a grade to next waypoint, information about the destination, or any combination thereof.

In some embodiments, the battery SoH information is received (step 110). For example, another portion of the vehicle ECU, another vehicle ECU, or a second device receives the battery SoH information. In some embodiments, the battery SoC information may also be transmitted and additionally used to determine directions to the destination (e.g., at step 112).

In some embodiments, directions to the destination are determined based on the battery SoH (step 112). For example, another portion of the vehicle ECU, another vehicle ECU, or a second device determines the directions to the destination (e.g., requested from step 102) based on the received battery SoH information. In some embodiments, the directions comprise a first itinerary in accordance with a determination that the battery state-of-health is above a threshold health level, and the directions comprise a second itinerary in accordance with a determination that the battery state-of-health is not above the threshold health level. In some embodiments, the threshold health level is a percentage relative to a fully healthy battery (e.g., 80% remaining battery SoH).

In some embodiments, the first itinerary comprises charging the electric vehicle at a first rate, the second itinerary comprises charging the electric vehicle at a second rate, and the first rate is higher than the second rate. For example, if the battery SoH of one or more batteries of the vehicle is above a threshold health level, the one or more batteries may be configured to charge at a faster rate. That is, the one more batteries may be healthy enough to receive energy at a higher rate. In contrast, if the battery SoH of one or more batteries of the vehicle is not above the threshold health level, the one or more batteries may not be configured to charge at the faster rate. That is, the one more batteries may not be healthy enough to receive energy at the higher rate (and tolerate degradation associated with charging at the higher rate).

In some embodiments, determining directions based on the battery SoH of one of more batteries of the vehicle advantageously improves the accuracy and/or efficiency of the directions. For example, determining the directions based on the battery SoH, which may be different between vehicles, depending on the above-mentioned usage behaviors, accounts for the battery's actual maximum state-of-charge. Hence, the vehicle's actual range (e.g., different from the vehicle's ideal range) is used to determine the directions, reducing a likelihood that the vehicle's range is over-estimated and a likelihood that the vehicle would run out of energy or make unexpected charging stops before completing its trip. Furthermore, a number of charging stops and/or duration of each stop may be optimized by determining the directions based on the vehicle's SoH.

In some embodiments, determining directions based on the battery SoH of one of more batteries of the vehicle advantageously increases the longevity of the one or more batteries, if the one or more batteries is determined to be below a particular health level. If the battery SoH is below a threshold health level (e.g., the associated one or more batteries are determined to be below a particular health level), the determined directions allow the one or more batteries to be charged at a slower rate, reducing degradation of battery health associated with charging the one or more batteries. If the battery SoH is above a threshold health level (e.g., the associated one or more batteries are determined to be above a particular healthy level), the determined directions allow the one or more batteries to be charged at a faster rate, speeding up charge time for the one or more batteries.

In some embodiments, the directions comprise charging the electric vehicle. The directions are determined based on an estimated charging time of the electric vehicle, and the charging time is estimated based on the battery state-of-health. For example, if the battery state-of-health is above a threshold health level, then the battery may be charged at a faster rate. Hence, the charging time of the vehicle may be reduced, and the directions may be determined based on the reduced charging time. Conversely, if the battery state-of-health is not above a threshold health level, then the battery may be charged at a slower rate (e.g., to reduce degradation of battery health). Hence, the charging time of the vehicle may be increased, and the directions may be determined based on the increased charging time.

In some embodiments, an input is received, and the directions are determined based on the received input. By determining the directions based on the input, the directions may be more suitable for a user, current route conditions, and/or current vehicle conditions.

The input may be received by the vehicle ECU from the user. The input may be information not from the user. For example, the input may comprise user preference, route information, route condition, a desired arrival time, an amount of rest time, road type (e.g., avoid freeways, toll roads), scenic route preferences, or any combination thereof. User preference may include preferred charging frequency along a route, trip cost, preferred minimum SoC (to reduce range anxiety), desired charging speed, preferred waypoints (e.g., dining preferences), or any combination thereof. The input may comprise information about the user's trip, such as deviations from the route such as off-roading, stoppage for food, lodging.

Route condition may include terrain information to improve estimate of vehicle power consumption while traveling. The terrain information may be retrieved from a database (e.g., a server as described with respect to FIG. 2) and provided as the input. The terrain information may be provided by one or more sensors of the vehicle. The information provided by the sensors may include latitude, longitude, altitude, grade, tire pressure(s), images, and other telemetry from the vehicle. This information from the vehicle may be transmitted to a database (e.g., a server as described with respect to FIG. 2), and this information may be used for determining directions in the future.

As an example, if the user prefers to take a short rest (e.g., 15 minutes) after a period of travel (e.g., two hours), the user may provide an input to the vehicle (e.g., via a user interface of the vehicle). In response to receiving the input, the directions may be determined further based on the input (e.g., in addition to battery state of health). Using this example, if the user indicates that he or she would like a short rest after a period of travel, the itinerary may comprise charging the electric vehicle at a slower rate, while the user takes the short rest, reducing degradation of battery health associated with charging the one or more batteries, regardless of battery SoH.

As another example, the input may be additional information associated with a route to the destination. For instance, the additional information indicates a strong headwind along the route to the destination. In response to receiving this input, the directions may be determined further based on the additional power consumption caused by the headwind. For example, the itinerary may include more frequent charging stops.

In some embodiments, the first itinerary comprises assigning the electric vehicle to a first charger and the second itinerary comprises assigning the electric vehicle to a second charger. The first charger is configured to provide a higher power output than the second charger. For example, because the first itinerary is associated with a battery SoH above a threshold health level, the corresponding one or more batteries may be assigned to a charger configured to provide a higher power output (e.g., DC charger). Because the second itinerary is associated with a battery SoH not above a threshold health level, the corresponding one or more batteries may be assigned to a charger configured to provide a slower power output (e.g., AC charger).

Assigning an electric vehicle to a charger based on battery SoH may increase the longevity of the one or more batteries of the vehicle, if the one or more batteries is determined to be below a particular health level. If the battery SoH is below a threshold health level (e.g., the associated one or more batteries are determined to be below a particular healthy level), the determined directions allow the one or more batteries to be charged at a slower rate by a slower charger, reducing degradation of battery health associated with charging the one or more batteries. If the battery SoH is above a threshold health level (e.g., the associated one or more batteries are determined to be above a particular healthy level), the determined directions allow the one or more batteries to be charged at a faster rate by a faster charger, speeding up charge time for the one or more batteries. Furthermore, the chargers may be more efficiently assigned (e.g., an AC charger may be more suited for charging a less healthy battery than charging a healthier battery), which may reduce overall charging time for a fleet of electric vehicles.

In some embodiments, the directions comprise charging the electric vehicle, and the directions are determined based on an output capability of a power dispenser for charging the electric vehicle. For example, as described above, depending on the battery SoH, a power dispenser having a suitable output capability is assigned to the vehicle along the route to the destination. As another example, the output capability of a first power dispenser may be low (e.g., the associated charging station is highly-occupied, the power dispenser is an AC charger), and the directions are determined to not include charging by the first power dispenser to reduce trip time (and avoid occupying the charging station more). Instead, the directions may be determined to include a second power dispenser with a higher output capability (e.g., the associated charging station is less occupied, the power dispenser is a DC charger), and the directions are determined to include charging by the second power dispenser to reduce trip time.

As an example, a vehicle has 15% SoC (for example, 45 miles of range remaining), and has 50 miles to its destination. Charging station A is 20 miles away and has one available power dispenser, and charging station B is 40 miles away and has two available power dispensers. The directions may comprise charging the vehicle at charging station B because a power dispenser at charging station B would provide greater power output than a power dispenser at charging station A at this time. Furthermore, because the vehicle would have a lower SoC when it reaches charging station B (compared to reaching charging station A), the vehicle would be able to charge at a faster rate and utilize more of the power delivered from a power dispenser at charging station B.

In some embodiments, the directions comprise itinerary recommendations. For example, the directions comprise points of interest, such as restaurants, grocery stores, attractions, recommended for the user while making the trip (e.g., while the vehicle is charging, while the vehicle is traveling).

In some embodiments, the directions are determined further based on a second battery state-of-health of a second electric vehicle. The directions comprise the first itinerary further in accordance with a determination that the second battery state-of-health level is lower than the first battery state-of-health level. The directions comprise the second itinerary in accordance with a determination that the second battery state-of-health level is not lower than the first battery state-of-health level.

For example, the vehicle transmitting the request for directions is a first vehicle of a vehicle fleet, and the directions are further based on a second battery SoH of a second vehicle of the vehicle fleet. For instance, it is determined that the second vehicle's battery SoH level lower than the first vehicle's battery SoH. This may mean that the one or more batteries of the first vehicle may be better configured for faster charging than the one or more batteries of the second vehicle. As such, the directions are determined to comprise an itinerary comprising charging the first vehicle at a faster rate (e.g., the first itinerary). In some examples, it is determined that the second vehicle's battery SoH level not lower than the first vehicle's battery SoH. This may mean that the one or more batteries of the second vehicle may be better configured for faster charging than the one or more batteries of the first vehicle. As such, the directions are determined to comprise an itinerary comprising charging the first vehicle at a slower rate (e.g., the second itinerary). Determining directions based on battery SoH of the first and second vehicles may allow more appropriate chargers to be assigned to respective vehicles, improving the longevity and/or optimizing charging time for a group of vehicles comprising the first and second vehicles (e.g., a fleet of vehicles).

In some embodiments, the directions comprise a recommendation to service the one or more batteries in accordance with a determination that the battery state-of-health is not above a second threshold health level. For example, if the first vehicle's battery SoH level is not above a health level suitable for making a trip to the destination (e.g., the battery may not store enough charge to travel to a charging station, the battery may need to be charged above a threshold number of times during the trip), then a recommendation to service the one or more batteries is provided to the user of the vehicle.

In some embodiments, information representing battery SoC of the vehicle is transmitted (e.g., with the battery SoH information). The battery SoC is associated with a charge level of the one or more batteries of the vehicle. In some embodiments, the directions comprise the first itinerary further in accordance with a determination that the battery state-of-charge of the electric vehicle is below a threshold charge level. For example, if it is determined that the battery SoC of the vehicle is below a threshold charge level (e.g., 20%), then the directions are determined to comprise an itinerary that allows the one or more batteries to be charged at a faster rate.

In some embodiments, instructions associated with the directions are transmitted (step 114). For example, instructions associated with the directions determined in step 112 are transmitted to the vehicle ECU requesting the directions. In some embodiments, instructions associated with the directions are received (step 116). For example, instructions associated with the directions transmitted in step 112 are received by the vehicle ECU requesting the directions.

In some embodiments, after receiving the instructions associated with the directions, information relating to the directions (e.g., steps of the direction) is presented to the user (e.g., via a user interface of the vehicle) and guide the user to the destination. In some embodiments, after receiving the instructions associated with the directions, the vehicle autonomously navigate to the destination according to these instructions (e.g., via the ADS and/or ADAS ECUs).

In some embodiments, an input is received after the instructions associated with the directions are received (e.g., after step 116). After the input is received, updated instructions associated with directions comprising a third itinerary is received. The third itinerary is different from the first itinerary and the second itinerary. For example, after the initial directions are received by the vehicle (e.g., from step 116), an input is received, and updated directions are received based on the received input.

The input may be received by the vehicle ECU from the user. For example, the input may comprise user input, updated user preference, updated route information, updated route condition, an updated desired arrival time, an updated amount of rest time, information related to travel delays, road type (e.g., avoid freeways, toll roads), scenic route preferences, or any combination thereof. User preference may include preferred charging frequency along a route, trip cost, preferred minimum SoC (to reduce range anxiety), desired charging speed, preferred waypoints (e.g., dining preferences), or any combination thereof. The input may comprise information about the user's trip, such as deviations from the route such as off-roading, stoppage for food, lodging. The input may comprise information about the user's trip, such as deviations from the route such as off-roading, stoppage for food, lodging.

As an example, if the user now wants to take a short rest (e.g., 15 minutes) after a period of travel (e.g., two hours), the user may provide an input to the vehicle (e.g., via a user interface of the vehicle). In response to receiving the input, the directions may be updated based on the input (e.g., in addition to battery state of health). Using this example, if the user indicates that he or she would like a short rest after a period of travel, the updated itinerary may comprise charging the electric vehicle at a slower rate, while the user takes the short rest, reducing degradation of battery health associated with charging the one or more batteries, regardless of battery SoH (the initial itinerary may comprise charging the electric vehicle at a faster rate).

As another example, the input may be updated information associated with a route to the destination. For instance, the updated information indicates a slower traffic along the route to the destination or includes terrain data indicating downhill travel. In response to receiving this input, the directions may be determined further based on the updated power consumption caused by the slower traffic or downhill travel. For example, the updated itinerary may include less frequent charging stops (or forgo charging) because the slower traffic or downhill travel reduces rate of power consumption.

As another example, the input may indicate the user's desire to deviate from the route between destinations such as off-roading. The directions may be updated to account for energy consumption for such deviations. For example, the directions may be updated to account for energy consumption estimates for off-roading, and based on the estimated consumption, the directions may comprise a maximum deviated route from the previously determined route (before the vehicle needs to return for charging).

In some embodiments, information representing a consumption rate of the one or more batteries of the electric vehicle is transmitted. Updated instructions associated with updated directions to the destination, determined based on the transmitted information, are determined. In some embodiments, the updated instructions associated with the updated directions are received. The updated directions comprise a third itinerary in accordance with a determination that the consumption rate is above a threshold rate. The updated directions comprise a fourth itinerary in accordance with a determination that the consumption rate is not above the threshold rate.

For example, information representing a consumption rate of the one or more batteries of the electric vehicle may be a difference between the vehicle's SoC over a period of time. This information may be transmitted from the vehicle's ECU and received by another portion of the vehicle's ECU, another ECU of the vehicle, or a second device. Based on the information representing the consumption rate, the other portion of the vehicle's ECU, other ECU of the vehicle, or the second device determines the directions based on the consumption rate and transmit instructions associated with the determined directions to the vehicle's ECU.

For instance, if it is determined that the consumption rate is higher than expected (e.g., due to updated route conditions), then the itinerary is updated to include more frequent charging and/or faster charging. Conversely, if it is determined that the consumption rate is lower than expected (e.g., due to updated route conditions), then the itinerary is updated to include less frequent charging and/or slower charging (and reducing degradation of battery health).

In some embodiments, as discussed above, the directions are determined based on an output capability of a power dispenser for charging the electric vehicle. In some instances, the output capability of the power dispenser is updated. For example, a DC charger is along a route to the destination is now available. As another example, a charging station is now less occupied, and the power dispensers in the charging station can provide a higher output. Updated directions may be determined based on the updated output capability of the power dispenser and information associated with the updated directions may be transmitted to the vehicle.

In some embodiments, in accordance with a determination that the directions comprise a same route for at least a threshold distance with a second vehicle, an indication to form a convoy is received by the electric vehicle. The convoy comprises the electric vehicle and the second vehicle. For example, based on the directions to the destination, it is determined (e.g., by a vehicle ECU, by an electronic device) that the electric vehicle will be traveling for at least a threshold distance along a same route (e.g., along a same highway for five miles) with a second vehicle. Based on this determination, an indication (e.g., a request, a confirmation) to form a convoy may be received by the electric vehicle. Additional examples and advantages of convoy formation are described below.

In some embodiments, the electric vehicle is determined to be a leading vehicle of convoy in accordance with a determination that the battery state-of-health is above a second threshold health level. For example, the electric vehicle may be determined to be the leading vehicle based on a determination that its battery state-of-health is above a threshold level. That is, the battery SoH of the vehicle is determined to be sufficiently healthy to tolerate a higher power consumption (and subsequent larger energy draw for charging) caused by wind resistance as the leading vehicle.

Particular embodiments may repeat one or more steps of the diagram of FIG. 1, where appropriate. Although this disclosure describes and illustrates particular steps of the diagram of FIG. 1 as occurring in a particular order, this disclosure contemplates any suitable steps of the diagram of FIG. 1 occurring in any suitable order. Moreover, although this disclosure describes and illustrates an example diagram for providing instructions associated with directions to a destination including the particular steps of the diagram of FIG. 1, this disclosure contemplates any suitable steps for providing instructions associated with directions to a destination including any suitable steps, which may include all, some, or none of the steps of the diagram of FIG. 1, where appropriate. Furthermore, although this disclosure describes and illustrates particular components, devices, or systems carrying out particular steps of the diagram of FIG. 1, this disclosure contemplates any suitable combination of any suitable components, devices, or systems carrying out any suitable steps of the diagram of FIG. 1. In particular embodiments, one or more steps of the diagram of FIG. 1 may be performed with one or more steps of the method of FIG. 3.

FIGS. 2A and 2B illustrate exemplary diagrams of a convoy formation. FIG. 2A depicts vehicles 202 and 204 not in a convoy formation. For example, vehicles 202 and 204 are traveling on different lanes along a same road, as depicted. The vehicle 202 may be vehicle 400, 500, or 550. The vehicle 204 may be vehicle 400, 500, or 550. The vehicle 202 may be associated with a wind resistance area 206, and the vehicle 204 may be associated with a wind resistance area 208. The wind resistance area may be an area in a direction of a moving vehicle such that air in the area would cause resistance to the vehicle movement. As another example, vehicles 202 and 204 are traveling on a same lane, but are further than a threshold distance (e.g., further than a slipstream of a vehicle, as described in more detail below) apart (not depicted). As another example, vehicles 202 and 204 are traveling on different roads (not depicted).

FIG. 2B depicts vehicles 202 and 204 in a convoy formation. In some embodiments, the convoy comprises a first vehicle (e.g., vehicle 204) traveling within a slipstream 212 of a second vehicle (e.g., vehicle 202), which is a leading vehicle of the convoy. A slipstream of vehicle may be an area in a direction opposite to a first moving vehicle, such that wind resistance associated with a second vehicle would be reduced, if the second vehicle were within the slipstream and moving in a same direction as the first vehicle. In some embodiments, the slipstream distance is determined based on power consumption data of past convoy formations. For example, the past convoy formation power consumption data are used to train a machine learning model to determine subsequent slipstream distance (e.g., to optimize power consumption reduction). While the leading vehicle may be associated with a wind resistance area 210, wind resistances associated with non-leading vehicles may be reduced as a result of convoy formation. A minimum of the distance 212 may be a minimum safe following distance in a convoy context (e.g., such that a following vehicle in a convoy has sufficient time to react to an action of vehicle in front in the convoy). A maximum of the distance 212 may be a farthest distance such that wind resistance associated with a following vehicle would be reduced.

Although FIGS. 2A and 2B depict two vehicles, it should be appreciated that more than two vehicles may form a convoy. For example, in some embodiments, the convoy further comprises a third vehicle. The third vehicle may be traveling within a slipstream of the first or second vehicle of the convoy (e.g., the third vehicle is a non-leading vehicle). The first or second vehicle of the convoy may be traveling within a slipstream of the third vehicle, and the third vehicle is the leading vehicle of the convoy. In some embodiments, the third vehicle joins the convoy at the initial formation of the convoy (by performing the methods disclosed herein). In some embodiments, the third vehicle joins an existing convoy while the convoy is traveling (by performing the methods disclosed herein).

Wind resistance may reduce power efficiency of a vehicle because additional power may be consumed for overcoming the wind resistance. The wind resistance may increase exponentially with speed. By performing the disclosed method and/or using the disclosed systems, vehicles may coordinate more efficiently and safely for forming a convoy, thereby reducing wind resistance and increasing vehicle power efficiency in an effective manner.

Although some examples of convoy formation are described with respect to electric vehicles, it should be appreciated that part or all of the convoy may comprise non-electric vehicles.

FIG. 3 is a flowchart illustrating steps of a method 300 for forming a convoy. In some embodiments, the steps of diagram 300 involve interactions between a first vehicle (e.g., vehicle 400, 500, 550, 202, 204), a second vehicle (e.g., vehicle 400, 500, 550, 202, 204), and/or an electronic device (e.g., server 520, server 530, landscape feature 540, computing device 450) for forming a convoy. The steps of flow 300 may be performed with the systems described with respect to FIGS. 2A, 2B, and 4-6B. It is appreciated that the steps of flow 300 leverage the features and advantages described with respect to FIGS. 2A, 2B, and 4-6B.

In some embodiments, the method 300 comprises communicating, by a first vehicle, a request to form a convoy (step 302). In some embodiments, communicating the request comprises transmitting the request, receiving the request, or combination thereof. For example, the vehicle 202 transmits a request to the vehicle 204 or to another electronic device (e.g., a server) to form a convoy. As another example, the vehicle 204 transmits a request to the vehicle 202 or to another electronic device to form a convoy. The request may be initiated by a user of a respective vehicle or by the vehicle without initiation by the user. In some embodiments, the request to form a convoy is communicated by another device (e.g., an electronic device associated with managing the vehicle). In some embodiments, information for forming the convoy is communicated via a protocol (e.g., a Vehicle-to-Vehicle (V2V) protocol, a Vehicle-to-Everything (V2E) protocol).

In some embodiments, the request to form the convoy can be made up to 7 days prior to formation of the convoy. In some embodiments, earlier requests to form the convoy are prioritized.

In some embodiments, the method 300 comprises in accordance with a determination that the first and second vehicles are traveling a same route for at least a threshold distance (step 304): receiving, by the first vehicle, a confirmation to form the convoy (step 306). The confirmation to form the convoy and information associated with the convoy (e.g., convoy travel time, information about other members of the convoy, route information, waypoints along the route, itinerary) may be presented to users of respective vehicles via their respective user interfaces.

The threshold distance may be a minimum traveling distance for a convoy to achieve a threshold amount of power consumption reduction (from the benefit of reduced wind resistance for some vehicles of the convoy). In some embodiments, the threshold distance is determined based on power consumption data of past convoy formations. For example, the past convoy formation power consumption data are used to train a machine learning model to determine threshold slipstream distance (e.g., to optimize power consumption reduction). In some embodiments, the determination that the first and second vehicles are traveling a same route for at least a threshold distance can be made up to 7 days prior to formation of convoy (e.g., the itineraries of the vehicles are matched prior to the trip).

In some embodiments, the same route is an optimized common route of the first vehicle and a route of the second vehicle. For example, the first and second vehicles are part of a fleet of vehicles (e.g., delivery vehicles). The delivery routes of the two vehicles may comprise an optimized amount of common route, to maximize distance traveled together as a convoy and maximizing the benefit of reduced wind resistance. In some embodiments, an itinerary of the first vehicle or the second vehicle is updated to optimize the common route between the two vehicles. For example, a departure time of the first vehicle may be scheduled earlier or recommended to be earlier (which may be declined by a user) to allow the two vehicles to travel together for longer distances in a convoy.

In some embodiments, the information regarding the route of the convoy is communicated to a power dispenser (e.g., a power dispenser along the route for charging a vehicle of the convoy), allowing the power dispenser to prepare for charging the vehicle when the vehicle arrives (e.g., indicate an unavailable status to other vehicles).

Using FIGS. 2A and 2B as an example, after the request for the convoy is received, a confirmation to form the convoy is received by the vehicle communicating the request to form the convoy (e.g., from step 302). The confirmation may be transmitted from another vehicle (e.g., a second vehicle of the convoy to-be-formed) or from another electronic device (e.g., a server).

In some embodiments, the confirmation to form the convoy is received further in accordance with a determination that a route condition criterion is met. The route condition criterion may comprise traffic condition, weather condition, road condition, or any combination thereof. For example, the confirmation to form the convoy is received further in accordance with a determination that speed of traffic along the same route is above a threshold speed (e.g., such that the benefits of reduced wind resistance is achieved). In some embodiments, the confirmation to form the convoy is not received in accordance with a determination that a route condition criterion is not met. For example, the confirmation to form the convoy is not received in accordance with a determination that traffic density is greater than a threshold along the same route (e.g., the convoy may not be formed for safety reasons).

In some embodiments, the confirmation to form the convoy is received further in accordance with a determination that a user criterion is met. The user criterion may be based on provided user preferences, profile of a user, a score of the user, user trip characteristics (e.g., scheduled vs unscheduled trip), or any combination thereof. For example, the confirmation to form the convoy is received further in accordance with a determination that the user expressed a preference to form the convoy (e.g., a preference to reduce power consumption via convoy formation, a preference to help others reduce power consumption via convoy formation).

As another example, the confirmation to form the convoy is further in accordance with a determination that the user has an associated score above a threshold score. The score may be determined based on whether the user has a history of being a reliable convoy member (e.g., a history of not abandoning the convoy while in formation). The score may be determined based on a number of braking events associated with the user while in convoy formation (e.g., as a leader, as a vehicle in front of another vehicle).

In some embodiments, the method 300 comprises in response to receiving the confirmation: in accordance with a determination that the first vehicle is the leading vehicle of convoy, receiving, by the first vehicle, an instruction to allow the second vehicle to travel within the slipstream of the first vehicle (step 308). For example, vehicle 202 is the vehicle communicating the request to form the convoy, and the vehicle 202 is determined (e.g., by another electronic device, by one or more of the vehicles of the convoy to-be-formed) to be the leading vehicle of the convoy. The vehicle 202 receives an instruction to allow the vehicle 204 to travel within the slipstream of the vehicle 202.

In some embodiments, the method 300 comprises providing, by the first vehicle, the instruction to allow the second vehicle to travel within the slipstream of the first vehicle or the instruction to travel within the slipstream of the second vehicle for the user to navigate the first vehicle. For example, the vehicle 202 may provide an instruction to the user to allow the vehicle 204 to travel within the slipstream of the vehicle 202.

In some embodiments, the method 300 comprises autonomously navigating, by the first vehicle, in accordance with the instruction to allow the second vehicle to travel within the slipstream of the first vehicle or the instruction to travel within the slipstream of the second vehicle. As an example, the vehicle 202 may receive an instruction to autonomously navigate and allow the vehicle 204 to travel within the slipstream of the vehicle 202.

In some examples (not depicted in FIG. 2B), vehicle 204 is the vehicle communicating the request to form the convoy, and the vehicle 204 is determined (e.g., by another electronic device, by one or more of the vehicles of the convoy to-be-formed) to be the leading vehicle of the convoy. The vehicle 204 receives an instruction to allow the vehicle 202 to travel within the slipstream of the vehicle 204. For example, the vehicle 204 may provide an instruction to the user to allow the vehicle 202 to travel within the slipstream of the vehicle 204. As another example, the vehicle 204 may receive an instruction to autonomously navigate and allow the vehicle 202 to travel within the slipstream of the vehicle 204.

In some embodiments, the method 300 comprises in accordance with a determination that the first vehicle is the leading vehicle of convoy, receiving, by the first vehicle, an indication of a reward. For example, the leading vehicle may notify the user about a reward for being the leader of convoy because the leading vehicle may not receive the benefit of reduced wind resistance like the non-leading members of the convoy. The reward may comprise a monetary reward, charging credit, virtual credit, social media awards, route optimization preference, toll exemption, HOV lane usage, exemption from metering lights, or any combination thereof.

In some embodiments, the first vehicle is determined to be the leading vehicle in accordance with a determination that a lead vehicle criterion is met. The lead vehicle criterion may comprise user preference, a score (e.g., from 0 to 100), vehicle characteristics, a time of convoy formation request, or any combination thereof. For example, the first vehicle is determined to the leading vehicle in accordance with a determination that the user provided a preference to be the leader of the convoy. As another example, the first vehicle is determined to be the leading vehicle in accordance with a determination that the first vehicle has a history of being a reliable leader (e.g., a history of not abandoning the convoy as a leader). As yet another example, the first vehicle is determined to be the leading vehicle based on characteristics of the first vehicle, such as its geometry (e.g., the first vehicle is a wider and/or taller vehicle that may further reduce wind resistance for the non-leading vehicles). In some embodiments, the request for forming the convoy can be made up to 7 days in advance. A user's desire to be a leader (or a non-leader) may be more likely met if the request is made earlier.

In some embodiments, the first vehicle is determined to be the leading vehicle in accordance with a determination that a battery state-of-health of the first vehicle is above a threshold level. For example, the vehicle 202 may be determined to be the leading vehicle based on a determination that its battery state-of-health is above a threshold level. That is, the battery SoH of vehicle 202 is determined to be sufficiently healthy to tolerate a higher power consumption (and subsequent larger energy draw for charging) caused by wind resistance as the leading vehicle.

In some embodiments, the method 300 comprises in response to receiving the confirmation: in accordance with a determination that the first vehicle is not the leading vehicle of the convoy, receiving, by the first vehicle, an instruction to travel within the slipstream of the second vehicle (step 310). For example, vehicle 202 is the vehicle communicating the request to form the convoy, and the vehicle 202 is determined (e.g., by another electronic device, by one or more of the vehicles of the convoy to-be-formed) not to be the leading vehicle of the convoy. The vehicle 202 receives an instruction to travel within the slipstream of the vehicle 204. For example, the vehicle 202 may provide an instruction to the user to travel within the slipstream of the vehicle 204. As another example, the vehicle 202 may receive an instruction to autonomously navigate and travel within the slipstream of the vehicle 204.

In some examples (not depicted in FIG. 2B), vehicle 204 is the vehicle communicating the request to form the convoy, and the vehicle 204 is determined (e.g., by another electronic device, by one or more of the vehicles of the convoy to-be-formed) not to be the leading vehicle of the convoy. The vehicle 204 receives an instruction to travel within the slipstream of the vehicle 202. For example, the vehicle 204 may provide an instruction to the user to travel within the slipstream of the vehicle 202. As another example, the vehicle 204 may receive an instruction to autonomously navigate and travel within the slipstream of the vehicle 202. In some embodiments, the first vehicle is traveling within a slipstream of a leading vehicle. In some embodiments, the first vehicle is traveling within a slipstream of another non-leading vehicle.

In some embodiments, the first vehicle is determined to not be the leading vehicle in accordance with a determination that a battery state-of-health of the first vehicle is not above a threshold level. For example, the vehicle 202 may be determined not to be the leading vehicle based on a determination that its battery state-of-health is not above a threshold level. That is, the battery SoH of vehicle 202 is determined to not be sufficiently healthy to tolerate a higher power consumption (and subsequent larger energy draw for charging) caused by wind resistance as the leading vehicle.

In some embodiments, the method 300 comprises in accordance with a determination that the first or second vehicle is traveling an updated route different from the same route, communicating, by the first vehicle, an instruction to disband the convoy. For example, while traveling in a convoy, the vehicle 202 or the vehicle 204 is determined to travel an updated route (e.g., one of the vehicles is deviating from its previously planned route). In accordance with this determination, the vehicle 202 (e.g., the vehicle that initially communicated the request to form the convoy) (or another electronic device) communicates an instruction to disband the convoy. For example, the instruction may allow a non-leading vehicle to manually or autonomously separate beyond the slipstream of the vehicle in front, or may allow a leading vehicle to manually or autonomously separate from a vehicle behind beyond the leading vehicle's slipstream. In some embodiments, an instruction to disband the convoy is communicated in response to receiving an indication to disband the convoy. For example, a vehicle in the convoy communicates a request to disband the convoy (e.g., by a user, by the vehicle), and in response to communicating the request, an instruction to disband the convoy is communicated. As another example, a vehicle breaks from the convoy formation (e.g., via manual maneuver, caused by road conditions), and in response, this vehicle communicates a request to disband the convoy. In response to communicating the request, an instruction to disband the convoy is communicated.

In some embodiments, the method 300 comprises in accordance with a determination that the first and second vehicles within a second threshold distance from an end of the same route, communicating, by the first vehicle, an instruction to disband the convoy. For example, the traveling convoy is within a threshold distance (e.g., 0.25 mile, 0.5 mile) from an end of a common route (e.g., the same route used to determine whether to form the convoy) between the two vehicles. In accordance with a determination that the convoy is within the threshold distance, the vehicle 202 (e.g., the vehicle that communicated the request to form the convoy) communicates an instruction to disband the convoy. In response to receiving the instruction to disband the convoy, a non-leading vehicle may manually or autonomously separate beyond the slipstream of the vehicle in front, or a leading vehicle may manually or autonomously separate from a vehicle behind beyond its slipstream. In some embodiments, an instruction to disband the convoy is communicated in accordance with a determination that the convoy has traveled a third threshold distance. For example, for safety reasons, the convoy may not travel beyond a maximum distance. The maximum distance may be determined based on e.g., health and safety guidelines (e.g., based on a driver's ability to pay attention to the road as part of the convoy) and recommendation for commercial vehicles.

In some embodiments, while traveling in the convoy, a non-leading vehicle takes the place of the leading vehicle, to ensure power consumption is balanced amongst members of the convoy. For example, if the first vehicle is initially determined to be the leading vehicle, around the halfway point of the same route (e.g., used to initially determine whether to form the convoy), the second vehicle becomes the leading vehicle (via manual or autonomous maneuver) to ensure balanced power consumption between the two vehicles (e.g., when it is safe to make this switch).

In some embodiments, the method 300 comprises in accordance with a determination that the first and second vehicles are not traveling the same route for at least a threshold distance: receiving, by the first vehicle, an indication declining the request (step 312). For example, the vehicle 202 is the vehicle communicating the request to form a convoy, and it is determined (e.g., by vehicle 202, by vehicle 204, by another electronic device) that vehicles 202 and 204 are not traveling the same route for at least the threshold distance. In accordance with this determination, the vehicle 202 receives (e.g., from vehicle 202, from vehicle 204, from another electronic device) an indication declining the request.

In some embodiments, the method 300 comprises communicating an indication declining the request to form the convoy, and in response to communicating the indication declining the request to form the convoy, forgoing transmitting the instruction to allow the second vehicle to travel within the slipstream of the first vehicle and the instruction to travel within the slipstream of the second vehicle. For example, the vehicle 202 receives a request to form a convoy and declines the request (e.g., based on user input, based on user preference, automatically by the vehicle, in accordance with a determination that the vehicles are not traveling the same route for at least the threshold distance) by communicating an indication declining the request. In response to communicating the indication, the vehicle 202 (or another electronic device) forgoes transmitting the instruction to allow the vehicle 204 to travel within the slipstream of vehicle 204.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing instructions associated formation of a convoy including the particular steps of the method of FIG. 3, this disclosure contemplates any suitable method for providing instructions associated with formation of a convoy including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3. In particular embodiments, one or more steps of the method of FIG. 3 may be performed with one or more steps of the diagram of FIG. 1.

Figure 4:
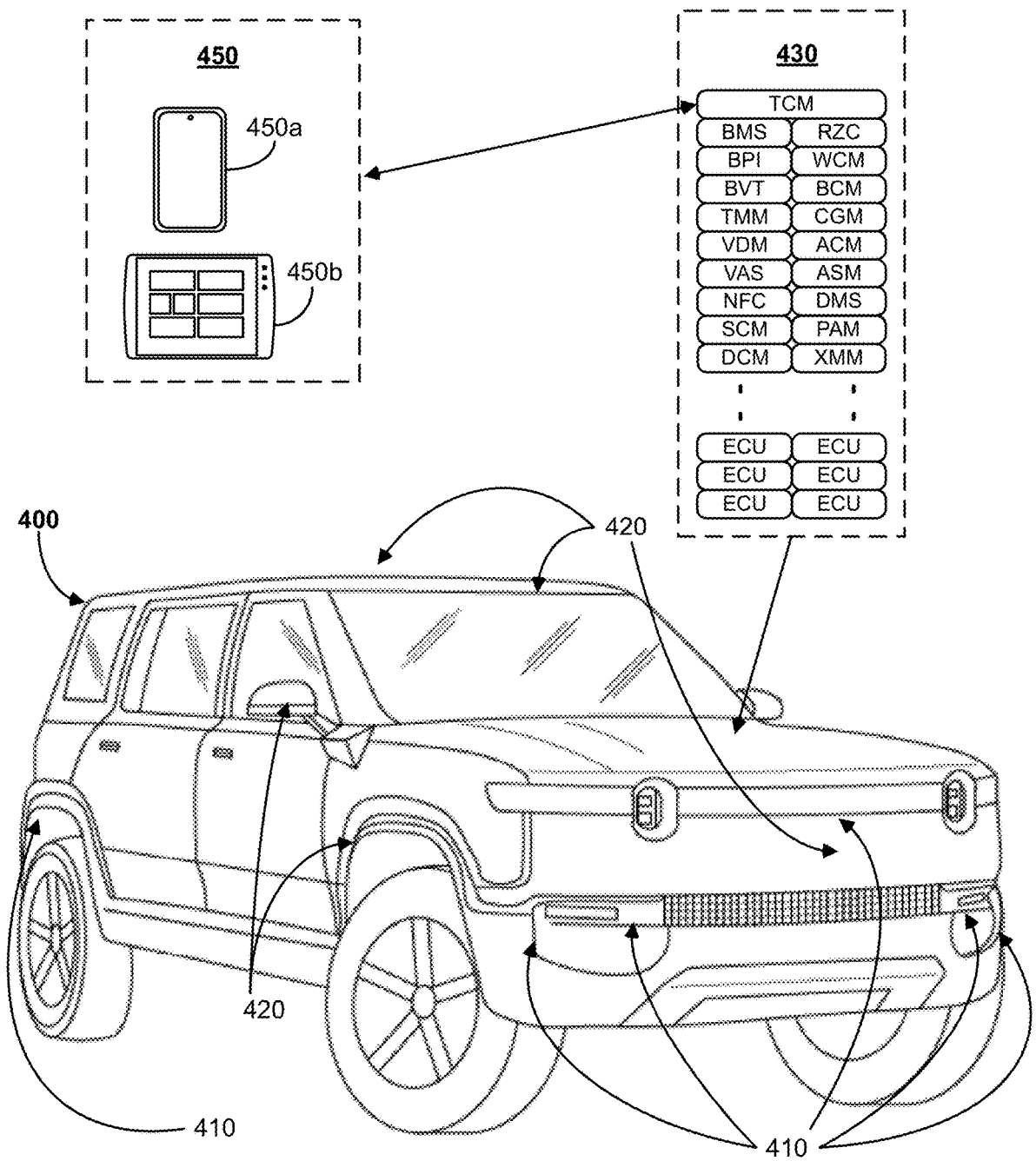
FIG. 4 illustrates an example vehicle.

FIG. 4 illustrates an example vehicle 400. Vehicle 400 may include multiple sensors 410, multiple cameras 420, and a control system 430. In some embodiments, vehicle 400 may be able to pair with a computing device 450 (e.g., smartphone 450a, tablet computing device 450b, or a smart vehicle accessory). As an example and not by way of limitation, a sensor 410 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 420 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 400 may include various controllable components (e.g., doors, seats, windows, lights, HVAC, entertainment system, security system), instrument and information displays and/or interactive interfaces, functionality to pair a computing device 450 with the vehicle (which may enable control of certain vehicle functions using the computing device 450), and functionality to pair accessories with the vehicle, which may then be controllable through an interactive interface in the vehicle or through a paired computing device 450.

Control system 430 may enables control of various systems on-board the vehicle. As shown in FIG. 4, control system 430 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by one or more ECUs that provide functionality related to the battery pack of the vehicle. A Battery Management System (BMS) ECU may control and monitor a number of different aspects related to the electric vehicle battery system. Functions that may be controlled by the BMS may include, by way of example and not limitation, controlling the battery pack contactors and pre-charge relay, monitoring the high voltage connector, measuring the pack puncture sensor resistance and pack water sensor resistance, controlling the battery pack fans, measuring busbar temperature, communicating with the BPI and BVT ECUs, and calculate state-of-charge (SoC) and battery state-of-health (SoH). A Battery Power Isolation (BPI) ECU may provide high-voltage sensing, measure the battery pack current, and facilitate determination of pack isolation. A Balancing Voltage Temperature (BVT) ECU may monitor battery module cell voltages, monitor temperature, and execute cell balancing. For example, the BMS ECU may provide the SoC and/or SoH information for route planning. As another example, the BMS ECU may provide the SoC and/or SoH information for convoy formation.

Features of embodiments as described herein may be controlled by a Vehicle Dynamics Module (VDM) ECU. The VDM ECU may control a number of different functions related to aspects of the vehicle's drivetrain, regenerative braking, suspension, steering, traction control, distribution of mass, aerodynamics, and driving modes. In some embodiments, the VDM ECU may, by way of example and not limitation, control vehicle acceleration, control vehicle energy regeneration, calculate torque distribution, provide traction control, control drive modes, provide odometer functions, control driveline disconnects, adjust damping, adjust roll stiffness, adjust ride height, automatically level a vehicle when on a slope, and control the emergency parking brake driver. For example, the VDM ECU may assist the control of the vehicle while forming a convoy, being a part of a convoy, or while disbanding the convoy.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication. For example, the VAS ECU may assist communication between the vehicle and another vehicle while forming a convoy, being a part of a convoy, or while disbanding the convoy.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 450, in-vehicle navigation, vehicle-to-vehicle communication, communication between the vehicle and landscape features (e.g., automated toll road sensors, automated toll gates, power dispensers at charging stations), or automated calling functionality. For example, the TCM ECU may assist communications over a network with the vehicle for route planning and/or convoy formation. As another example, the TCM ECU may assist communication between the vehicle and another vehicle while forming a convoy, being a part of a convoy, or while disbanding the convoy.

Features of embodiments as described herein may be controlled by a Rear Zone Control (RZC) ECU. The RZC ECU may provide functionality to control different body components, such as, by way of example and not limitation, a license plate lamp, based on vehicle body type. For vehicles with a truck bed, the RZC ECU may provide functionality to control a tonneau cover, sidebin latch, tailgate latch, sidebin lights, or cargo lamps. For a sport utility-type vehicle with a rear door, the RZC ECU may provide functionality to control liftgate latches, a liftgate actuator, puddle lamps, or a rear wiper. For vehicles with a tow hitch, the RZC ECU may provide functionality to control trailer braking or a trailer brake stop light. For vehicles with a third row of seats, the RZC ECU may provide functionality to control movement of interior components to facilitate easy entry to the rear seats. For a delivery vehicle, the RZC ECU may provide functionality to control movement of a bulkhead door motor and latches, rollup door latches, various lamps, rear stop lights, and turn lights. For example, the RZC ECU may provide visual signals to another vehicle (e.g., via the rear stop lights, turn lights) for convoy formation (e.g., signaling a rear vehicle to form a convoy or disband a convoy).

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking. For example, the BCM ECU may provide visual signals to another vehicle (e.g., via exterior lighting) for convoy formation (e.g., signaling a vehicle in front to form a convoy or disband a convoy).

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s). For example, the CGM ECU may assist communication between the battery and another vehicle ECU for communicating SoC and/or SoH information for route planning and/or convoy formation. As another example, the CGM ECU may serve as the master control over the different vehicle modes while the vehicle is in a convoy.

Features of embodiments as described herein may be controlled by one or more ECUs may provide functions of an automated driving system (ADS) and/or an advanced driver assistance system (ADAS) that may be enabled by a driver of the vehicle to provide one or more functions to support driving assistance and/or automation. An Autonomy Control Module (ACM) ECU may process data captured by cameras 420 and/or sensors 410. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras 420 and/or sensors 410 in order to determine appropriate control commands. For example, the ECUs associated with the ADS and/or ADAS may assist the autonomous navigation of the vehicle while traveling a route planned based on battery SoC and/or SoH information. As another example, the ECUs associated with the ADS and/or ADAS may assist the autonomous navigation of the vehicle while forming a convoy, being in a convoy, or disbanding a convoy.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 430. In some embodiments, functions of the ACM and the XMM may be combined together into an Autonomous eXperience Module (AXM) ECU. For example, the XMM and/or the AXM may assist providing an interface for providing information and/or receiving an input associated with route planning and/or convoy formation.

Vehicle 400 may include one or more additional ECUs, such as, by way of example and not limitation: a Central Gateway Module (CGM) ECU, a Telematics Control Module (TCM) ECU, a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Rear Zone Control (RZC) ECU, an Autonomy Control Module (ACM) ECU, an Autonomous Safety Module (ASM) ECU, and/or a Driver Monitoring System (DMS) ECU. If vehicle 400 is an electric vehicle, one or more ECUs may provide functionality related to the battery pack of the vehicle, such as a Battery Management System (BMS) ECU and/or a Battery Power Isolation (BPI) ECU.

Figure 5:
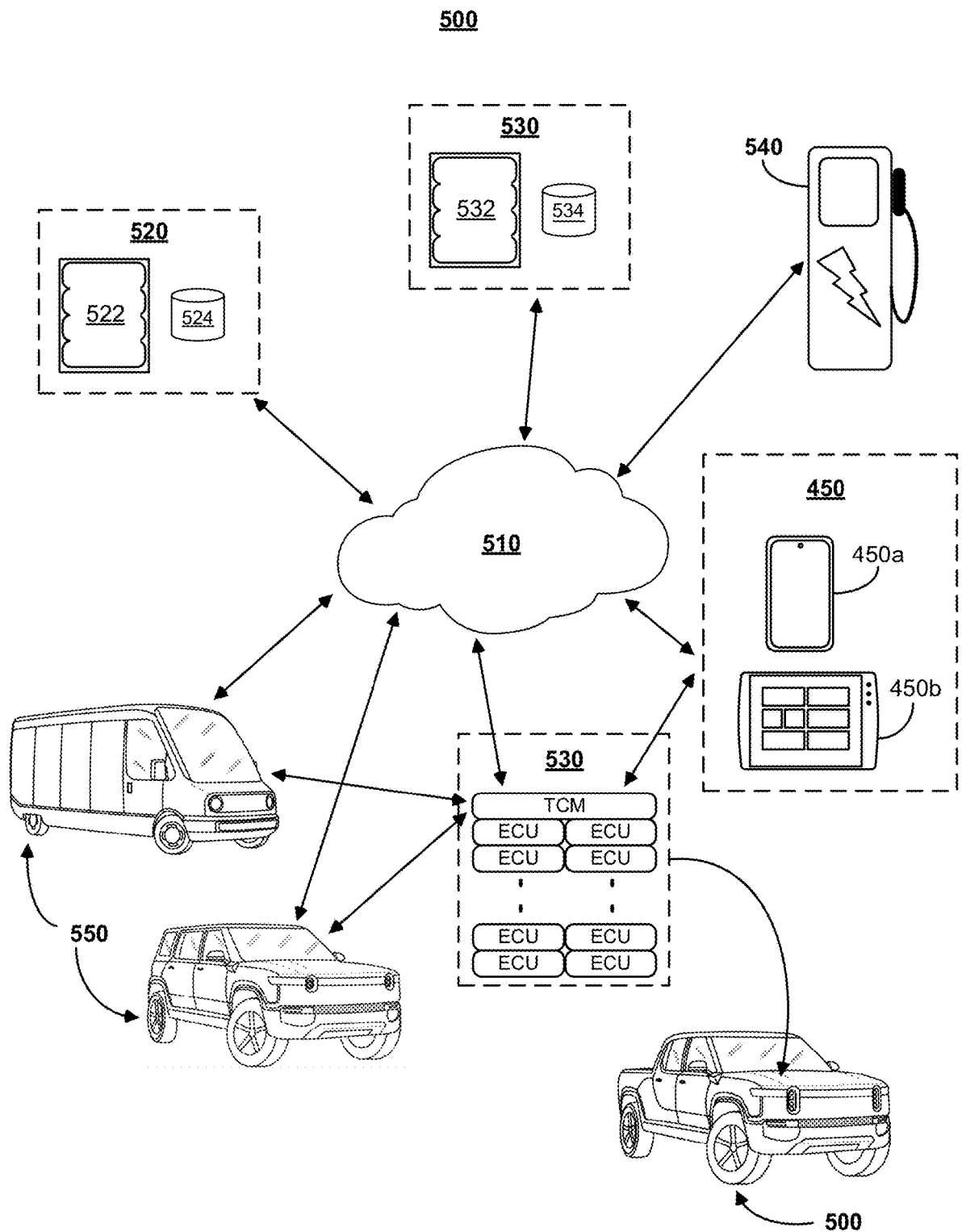
FIG. 5 illustrates a system for providing instructions associated with directions to a destination.

FIG. 5 illustrates a system for providing instructions associated with directions to a destination. For example, FIG. 5 illustrates an example networked environment 500. Computer system 500 may include a connected vehicle 400 with a control system 430 that is capable of transmitting data to/from a network 510. Network 510 may also be connected to one or more computing servers 520 (e.g., including compute units 522 and storage units 524) associated with a vehicle manufacturer, a vehicle service provider, a vehicle fleet operator, or a vehicle-charging facility provider. Network 510 may also be connected to one or more third-party computing servers 530 (e.g., including compute units 532 and storage units 534) associated with, for example, a smart accessory manufacturer, a group event organizer, service provider, a governmental organization, or an organization associated with route guidance. Networked environment 500 may include one or more landscape features 540 (e.g., automated toll road sensors, smart road signs or road markers, automated toll gates, power dispensers at charging stations). For example, a power dispenser may communicate information associated with its power output capability and/or its availability over the network for determining directions to a destination for a vehicle. Networked environment 500 may also include other connected vehicles 550 that may be capable of communicating with vehicle 400 through network 510 and/or directly with vehicle 400 (e.g., by communicating with a TCM ECU of a control system 430 of vehicle 400 when connected vehicle 550 is within range of a short-range communications network, such as Bluetooth). For example, the vehicle 400 and the other connected vehicles 550 may communicate for forming a convoy. Networked environment 500 may also include one or more computing devices 450 (e.g., smartphone 450a, a tablet computing device 450b, or a smart vehicle accessory) capable of communicating with network 510 and/or directly with vehicle 400.

Networked environment 500 may enable transmission of data and communications between any of the depicted elements. In some embodiments, such information may be communicated in one direction (e.g., a smart road sign broadcasting information related to traffic control or delays due to construction); in other embodiments, information may include two-way communications (e.g., an automated toll gate that processes a request received from vehicle 400 to deduct a toll from a specified account and provides confirmation of the transaction, a server receiving vehicle SoC and/or SoH information and transmitting instructions associated directions to a destination for the vehicle, a server receiving vehicle information and transmitting instructions associated with convoy formation). In particular embodiments, one or more elements of networked environment 500 may include one or more computer systems, as described in further detail with respect to FIG. 6A. In particular embodiments, one or more elements of networked environment 500 perform one or more steps of one or more methods described or illustrated herein. In particular embodiments, software running on one or more elements of networked environment 500 may be controlled by a single entity to perform one or more steps of one or more methods described or illustrated herein or provide functionality described or illustrated herein.

Figures 6A, 6B:
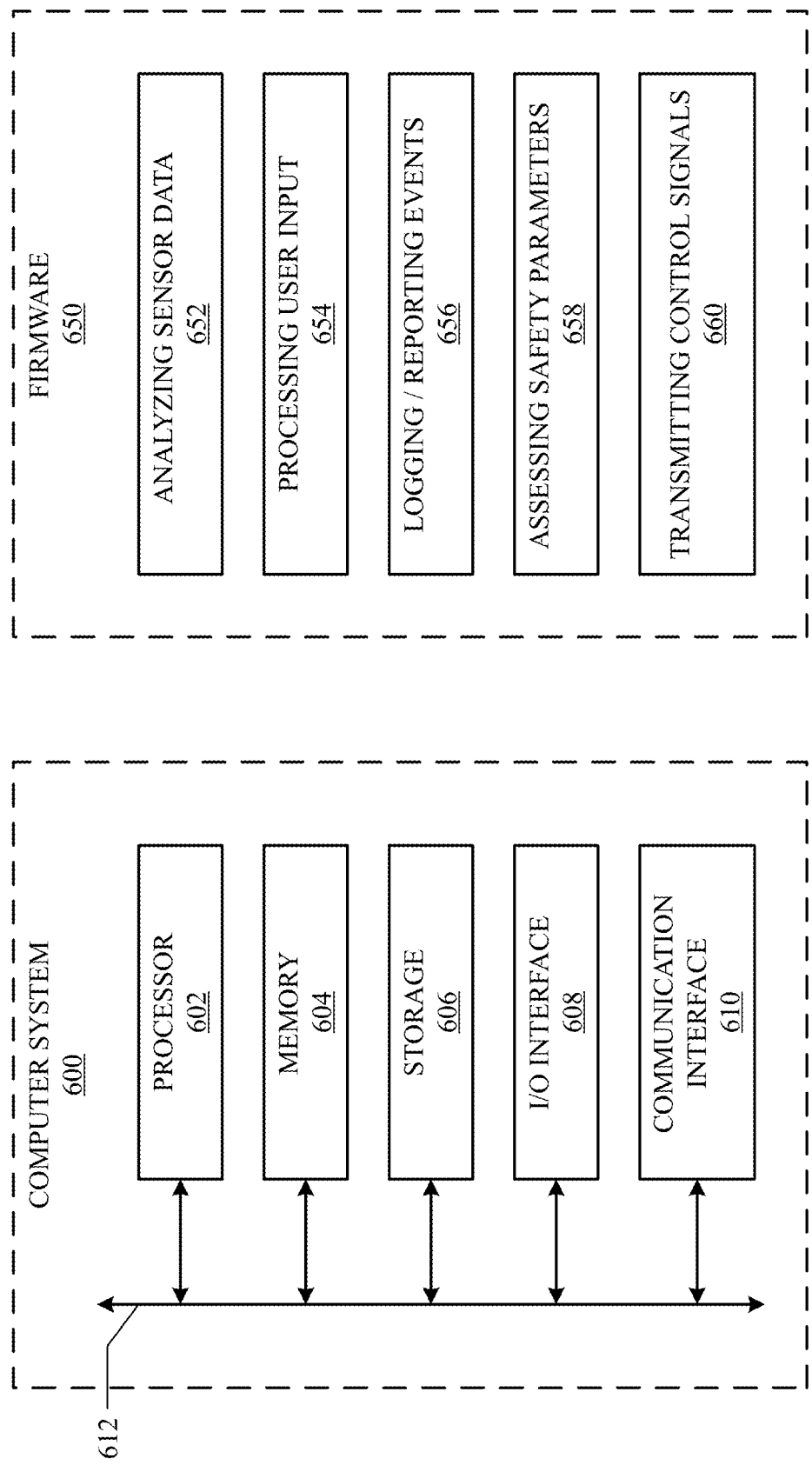
FIG. 6A is a schematic of an example computer system.
FIG. 6B illustrates example firmware for a vehicle ECU.

FIG. 6A illustrates an example computer system 600. The computer system 600 may perform one or more steps of a disclosed method, such as determination of directions to a destination for a vehicle or determination of whether and/or how to form a convoy. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 (e.g., compute units 522 and 532) may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606 (e.g., storage units 524 and 534). Processor 602 may include one or more internal caches for data, instructions, or addresses.

In particular embodiments, memory 604 includes main memory for storing instructions for processor 602 to execute or data for processor 602 to operate on. In particular embodiments, one or more memory management units (MMUs) reside between processor 602 and memory 604 and facilitate accesses to memory 604 requested by processor 602. In particular embodiments, memory 604 includes random access memory (RAM). This disclosure contemplates any suitable RAM.

In particular embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In particular embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 400 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 410 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In particular embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 430. Firmware 650 may include functions 652 for analyzing sensor data based on signals received from sensors 410 or cameras 420 received through communication interface 610. Firmware 650 may include functions 654 for processing user input (e.g., directly provided by a driver of or passenger in vehicle 400, or provided through a computing device 450) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 400 and nearby vehicles). Firmware 650 may include functions 660 for transmitting control signals to components of vehicle 400, including other vehicle ECUs 600.

In some embodiments, a method comprises: transmitting, by an electric vehicle, a request for directions to a destination; determining, by the electric vehicle, battery state-of-health of the electric vehicle, wherein the battery state-of-health is associated with a maximum capacity of one or more batteries of the electric vehicle; transmitting, by the electric vehicle, information representing the battery state-of-health; and receiving, by the electric vehicle, instructions associated with the directions to the destination. The directions comprise a first itinerary in accordance with a determination that the battery state-of-health is above a threshold health level, and the directions comprise a second itinerary in accordance with a determination that the battery state-of-health is not above the threshold health level.

In some embodiments, the first itinerary comprises charging the electric vehicle at a first rate, the second itinerary comprises charging the electric vehicle at a second rate, and the first rate is higher than the second rate.

In some embodiments, the method further comprises receiving an input, wherein the directions are determined further based on the received input.

In some embodiments, the input comprises user preference, route information, route condition, a desired arrival time, an amount of rest time, road type, scenic route preferences, or any combination thereof.

In some embodiments, the method further comprises: receiving, by the electric vehicle, an input; and receiving, by the electric vehicle, updated instructions associated directions comprising a third itinerary determined based on the input, the third itinerary different from the first itinerary and the second itinerary.

In some embodiments, the first itinerary comprises assigning the electric vehicle to a first charger, the second itinerary comprises assigning the electric vehicle to a second charger, and the first charger is configured to provide a higher power output than the second charger.

In some embodiments, the directions are determined further based on a second battery state-of-health of a second electric vehicle, the directions comprise the first itinerary further in accordance with a determination that the second battery state-of-health level is lower than the first battery state-of-health level, and the directions comprise the second itinerary in accordance with a determination that the second battery state-of-health level is not lower than the first battery state-of-health level.

In some embodiments, the method further comprises: transmitting, by the electric vehicle, information representing a consumption rate of the one or more batteries of the electric vehicle; receiving, by the electric vehicle, updated instructions associated with updated directions to the destination. The updated directions comprise a third itinerary in accordance with a determination that the consumption rate is above a threshold rate, and the updated directions comprise a fourth itinerary in accordance with a determination that the consumption rate is not above the threshold rate.

In some embodiments, the directions comprise a recommendation to service the one or more batteries in accordance with a determination that the battery state-of-health is not above a second threshold health level.

In some embodiments, the method further comprises transmitting, by the electric vehicle, information representing battery state-of-charge of the electric vehicle. The battery state-of-charge is associated with a charge level of the one of more batteries, and the directions comprise the first itinerary further in accordance with a determination that the battery state-of-charge of the electric vehicle is below a threshold charge level.

In some embodiments, the directions comprise charging the electric vehicle, the directions are determined based on an estimated charging time of the electric vehicle, and the charging time is estimated based on the battery state-of-health.

In some embodiments, the directions comprise charging the electric vehicle, and the directions are determined based on an output capability of a power dispenser for charging the electric vehicle.

In some embodiments, the output capability of the power dispenser is updated, the method further comprising receiving updated directions determined based on the updated output capability of the power dispenser.

In some embodiments, the directions comprise itinerary recommendations.

In some embodiments, the directions comprise itinerary recommendations.

In some embodiments, the method further comprises in accordance with a determination that the directions comprise a same route for at least a threshold distance with a second vehicle: receiving, by the electric vehicle, an indication to form a convoy comprising the electric vehicle and the second vehicle.

In some embodiments, the electric vehicle is determined to be a leading vehicle of convoy in accordance with a determination that the battery state-of-health is above a second threshold health level.

In some embodiments, an electric vehicle comprises one or more processors configured to execute a method comprising: transmitting a request for directions to a destination; determining battery state-of-health of an electric vehicle, wherein the battery state-of-health is associated with a maximum capacity of one or more batteries of the electric vehicle; transmitting information representing the battery state-of-health; and receiving instructions associated with the directions to the destination. The directions comprise a first itinerary in accordance with a determination that the battery state-of-health is above a threshold health level, and the directions comprise a second itinerary in accordance with a determination that the battery state-of-health is not above the threshold health level.

In some embodiments, the first itinerary comprises charging the electric vehicle at a first rate, the second itinerary comprises charging the electric vehicle at a second rate, and the first rate is higher than the second rate.

In some embodiments, the method further comprises receiving an input, wherein the directions are determined further based on the received input.

In some embodiments, a non-transitory computer readable storage medium stores one or more programs, the one or more programs comprising instructions, which when executed by a system with one or more processors and memory, cause the system to perform a method comprising: transmitting a request for directions to a destination; determining battery state-of-health of an electric vehicle, wherein the battery state-of-health is associated with a maximum capacity of one or more batteries of the electric vehicle; transmitting information representing the battery state-of-health; and receiving instructions associated with the directions to the destination. The directions comprise a first itinerary in accordance with a determination that the battery state-of-health is above a threshold health level, and the directions comprise a second itinerary in accordance with a determination that the battery state-of-health is not above the threshold health level.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
    transmitting, by an electric vehicle, a request for directions to a destination;
    determining, by the electric vehicle, battery state-of-health of the electric vehicle, wherein the battery state-of-health is associated with a maximum capacity of one or more batteries of the electric vehicle;
    transmitting, by the electric vehicle, information representing the battery state-of-health;
    receiving, by the electric vehicle, instructions associated with the directions to the destination, the directions comprising:
        a first itinerary in accordance with a determination that the battery state-of-health is above a threshold health level, and
        a second itinerary in accordance with a determination that the battery state-of-health is not above the threshold health level; and
    receiving, by the electric vehicle and in accordance with a determination that the directions for the electric vehicle have a same route as second directions for a second vehicle for at least a threshold distance, an indication to form a convoy comprising the electric vehicle and the second vehicle, wherein:
        the electric vehicle is identified as a leading vehicle of the convoy responsive to the battery state-of-health being above a second threshold health level.

2. The method of claim 1, wherein:
    the first itinerary comprises charging the electric vehicle at a first rate; and
    the second itinerary comprises charging the electric vehicle at a second rate, lower than the second rate.

3. The method of claim 1, further comprising receiving an input, wherein the directions are determined further based on the received input.

4. The method of claim 3, wherein the input comprises one or more of: a user preference, route information, a route condition, a desired arrival time, an amount of rest time, a road type, or a scenic route preference.

5. The method of claim 1, further comprising:
receiving, by the electric vehicle, an input; and
receiving, by the electric vehicle, updated instructions associated with updated directions comprising a third itinerary determined based on the input, the third itinerary different from the first itinerary and the second itinerary.

6. The method of claim 1, wherein:
the first itinerary comprises an assignment of the electric vehicle to a first charger,
the second itinerary comprises an assignment of the electric vehicle to a second charger, and
the first charger is configured to provide a higher power output than the second charger.

7. The method of claim 1, wherein the directions:
are determined further based on a second battery state-of-health of a second electric vehicle,
comprise the first itinerary further in accordance with a determination that the second battery state-of-health level is lower than the first battery state-of-health level, and
comprise the second itinerary in accordance with a determination that the second battery state-of-health level is not lower than the first battery state-of-health level.

8. The method of claim 1, further comprising:
transmitting, by the electric vehicle, information representing a consumption rate of the one or more batteries of the electric vehicle;
receiving, by the electric vehicle, updated instructions associated with updated directions to the destination, wherein:
the updated directions comprise a third itinerary in accordance with a determination that the consumption rate is above a threshold rate, and
the updated directions comprise a fourth itinerary in accordance with a determination that the consumption rate is not above the threshold rate.

9. The method of claim 1, wherein the directions comprise a recommendation to service the one or more batteries in accordance with a determination that the battery state-of-health is not above the second threshold health level.

10. The method of claim 1, further comprising transmitting, by the electric vehicle, information representing battery state-of-charge of the electric vehicle, wherein:
the battery state-of-charge is associated with a charge level of the one or more batteries, and
the directions comprise the first itinerary further in accordance with a determination that the battery state-of-charge of the electric vehicle is below a threshold charge level.

11. The method of claim 1, wherein:
the directions comprise charging the electric vehicle,
the directions are determined based on an estimated charging time of the electric vehicle, and
the estimated charging time is predicted based on the battery state-of-health.

12. The method of claim 1, wherein:
the directions comprise directions to charge the electric vehicle, and
the directions are determined based on an output capability of a power dispenser for charging the electric vehicle.

13. The method of claim 12, comprising receiving updated directions determined based on an update to an indication of an output capability of the power dispenser.

14. The method of claim 1, wherein the directions comprise itinerary recommendations.

15. An electric vehicle comprising one or more processors configured to execute a method comprising:
transmitting a request for directions to a destination;
determining a battery state-of-health of an electric vehicle, wherein the battery state-of-health is associated with a maximum capacity of one or more batteries of the electric vehicle;
transmitting information representing the battery state-of-health;
receiving instructions associated with the directions to the destination, wherein:
the directions comprise a first itinerary in accordance with a determination that the battery state-of-health is above a threshold health level, and
the directions comprise a second itinerary in accordance with a determination that the battery state-of-health is not above the threshold health level; and
receiving, in accordance with a determination that the directions for the electric vehicle have a same route as second directions for a second vehicle for at least a threshold distance, an indication to form a convoy comprising the electric vehicle and the second vehicle, wherein the electric vehicle is identified as a leading vehicle of the convoy responsive to the battery state-of-health being above a second threshold health level.

16. The electric vehicle of claim 15, wherein:
the first itinerary comprises directions to charge the electric vehicle at a first rate, and
the second itinerary comprises directions to charge the electric vehicle at a second rate, and the first rate is higher than the second rate.

17. The electric vehicle of claim 15, wherein the method further comprises receiving an input, wherein the directions are determined further based on the received input.

18. A non-transitory computer readable storage medium storing instructions, which when executed by a system with one or more processors and memory, cause the system to perform a method comprising:
transmitting a request for directions to a destination;
determining a battery state-of-health of an electric vehicle, wherein the battery state-of-health is associated with a maximum capacity of one or more batteries of the electric vehicle;
transmitting information representing the battery state-of-health;
receiving instructions associated with the directions to the destination, wherein:
the directions comprise a first itinerary in accordance with a determination that the battery state-of-health is above a threshold health level, and
the directions comprise a second itinerary in accordance with a determination that the battery state-of-health is not above the threshold health level; and
receiving, in accordance with a determination that the directions for the electric vehicle have a same route as second directions for a second vehicle for at least a threshold distance, an indication to form a convoy comprising the electric vehicle and the second vehicle, wherein the electric vehicle is identified as a leading vehicle of the convoy responsive to the battery state-of-health being above a second threshold health level.

* * * * *